US008075209B2

(12) United States Patent
Revankar

(10) Patent No.: US 8,075,209 B2
(45) **Date of Patent: *Dec. 13, 2011**

(54) METHOD OF PRINTING IMAGES TO COMPENSATE FOR PILE HEIGHT DIFFERENTIAL

(75) Inventor: Shriram V. Revankar, Webster, NY (US)

(73) Assignee: Xerox Corporation, Norwalk, CT (US)

(*) Notice: Subject to any disclaimer, the term of this patent is extended or adjusted under 35 U.S.C. 154(b) by 926 days.

This patent is subject to a terminal disclaimer.

(21) Appl. No.: 12/059,229

(22) Filed: Mar. 31, 2008

(65) Prior Publication Data

US 2009/0245911 A1 Oct. 1, 2009

(51) Int. Cl.
*B41J 15/16* (2006.01)
*G06F 3/12* (2006.01)

(52) U.S. Cl. .......................... 400/614; 400/76; 358/1.18

(58) Field of Classification Search .................. 400/614, 400/614.1

See application file for complete search history.

(56) References Cited

U.S. PATENT DOCUMENTS

| | | | | |
|---|---|---|---|---|
| 5,754,302 | A | 5/1998 | Coleman | |
| 6,196,675 | B1 * | 3/2001 | Deily et al. | 347/103 |
| 6,203,953 | B1 | 3/2001 | Dalal | |
| 2005/0041087 | A1 * | 2/2005 | Ueda | 347/171 |
| 2006/0132519 | A1 | 6/2006 | Kovacs | |
| 2007/0059616 | A1 | 3/2007 | Mishra et al. | |
| 2008/0181709 | A1 * | 7/2008 | Vila et al. | 400/613 |
| 2009/0274499 | A1 * | 11/2009 | Kovacs et al. | 399/335 |

FOREIGN PATENT DOCUMENTS

| | | | |
|---|---|---|---|
| JP | 58045073 | A * | 3/1983 |
| JP | 63028671 | A * | 2/1988 |
| JP | 2007083611 | A * | 4/2007 |

* cited by examiner

*Primary Examiner* — Daniel J Colilla

(74) *Attorney, Agent, or Firm* — Maginot, Moore & Beck LLP

(57) ABSTRACT

A method of printing a plurality of images on a length of media comprises feeding the media from an input roll of media to a printing device where images are printed on the media. After images are printed on the media, the media is delivered to an output roll. The method further comprises determining a pile height differential on the printed media for at least one initial image. Based on the determined pile height differential, subsequent images printed on the media are modified. The subsequent images are modified in a manner designed to compensate for the determined pile height differential. Accordingly, a method of roll-to-roll printing is disclosed that may be used to balance the ink layer across the width of the roll of media and maintain the cylindrical shape of the output roll in various printing applications.

16 Claims, 6 Drawing Sheets

METHOD OF PRINTING IMAGES TO COMPENSATE FOR PILE HEIGHT DIFFERENTIAL

FIELD

The embodiments disclosed herein relate to the field of ink printing and specifically to roll-to-roll media printing applications.

BACKGROUND

Roll-to-roll printing is commonly used to produce a plurality of images on a single length of media. In roll-to-roll printing, a length of media in the form of a print substrate is fed from an input roll to a printing device. The printing device prints images on the substrate and the substrate is then fed to an output roll.

One application for roll-to-roll printing is the flexible packaging industry (e.g., packaging for chips or other snacks). In some applications of flexible packaging printing is done on very thin films. When the thickness of the ink layer printed on the substrate is substantial (e.g., the thickness of the ink layer approaches the thickness of the substrate), it can introduce distortion to the output roll which may disrupt normal operations. In particular, if the cumulative pile height of the printed ink is not relatively consistent across the roll, one side or a portion of the output roll may become unbalanced. For example, if an image printed on the right side of a substrate contains substantial content, while the image printed on the left side of the substrate contains only limited content, the right side of the substrate will have a greater cumulative pile height and the output roll will end up with a greater circumference than the left side of the output roll. In addition, the right side of the roll will tend to be taut while the left side of the roll will tend to be loose. When the same or similar image is repeatedly printed, as is typically the case with roll-to-roll printing, this repetition only magnifies the pile height problem at the output roll. Distortion in the output roll creates problems during both the printing process and downstream in the packaging process.

In view of the foregoing, it would be advantageous to provide a method of printing images to compensate for pile height differentials.

SUMMARY

A method of printing a plurality of images on a length of media comprises feeding the media from an input roll of media to a printing device where images are printed on the media. After images are printed on the media, the media is delivered to an output roll. The method further comprises determining a pile height differential on the printed media for at least one initial image. Based on the determined pile height differential, subsequent images printed on the media are modified. The subsequent images are modified based on the determined pile height differential.

In at least one embodiment, the pile height differential is determined by estimating a printed pile height profile for at least one of the images. Thereafter, a plurality of cumulative pile heights are calculated for the at least one of the images. The plurality of cumulative pile heights are calculated along a plurality of lines parallel to the media feed direction. Furthermore, a cross-sectional height differential for at least one of the images in a direction perpendicular to the feed direction may also be calculated when calculating the pile height differential.

In at least one embodiment, the subsequent images printed on the media are modified by adjusting the position of the subsequent images relative to the position the initial image was printed on the media. Adjusting the position of the subsequent images may comprise translating the subsequent images relative to the at least one initial image by moving the subsequent images perpendicular to the feed direction toward one of the lateral edges of the printed media. Furthermore, adjusting the position of the subsequent images may comprise rotating the subsequent images on the printed media.

In at least one embodiment, determining the pile height differential comprises monitoring the destination role using pile height sensors. The pile height sensors deliver a signal to the printing device that indicates any distortion in the destination role. If a distortion in the destination role exists, subsequent images printed by the printing device are modified in a manner designed to compensate for the distortion in the destination role.

In at least one embodiment, the subsequent images are modified by adding at least one patch of a known pile height to media when the subsequent images are printed. The at least one patch is provided on a pile height management area of the media, such as a media waste area or a blank area for the subsequent images. The at least one patch may be of a substantially constant value and may be provided as a continuous line on the media or a plurality of rectangles, dots, or other shapes.

The above described features and advantages, as well as others, will become more readily apparent to those of ordinary skill in the art by reference to the following detailed description and accompanying drawings. While it would be desirable to provide a method of printing images that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

DESCRIPTION

Figure 1:
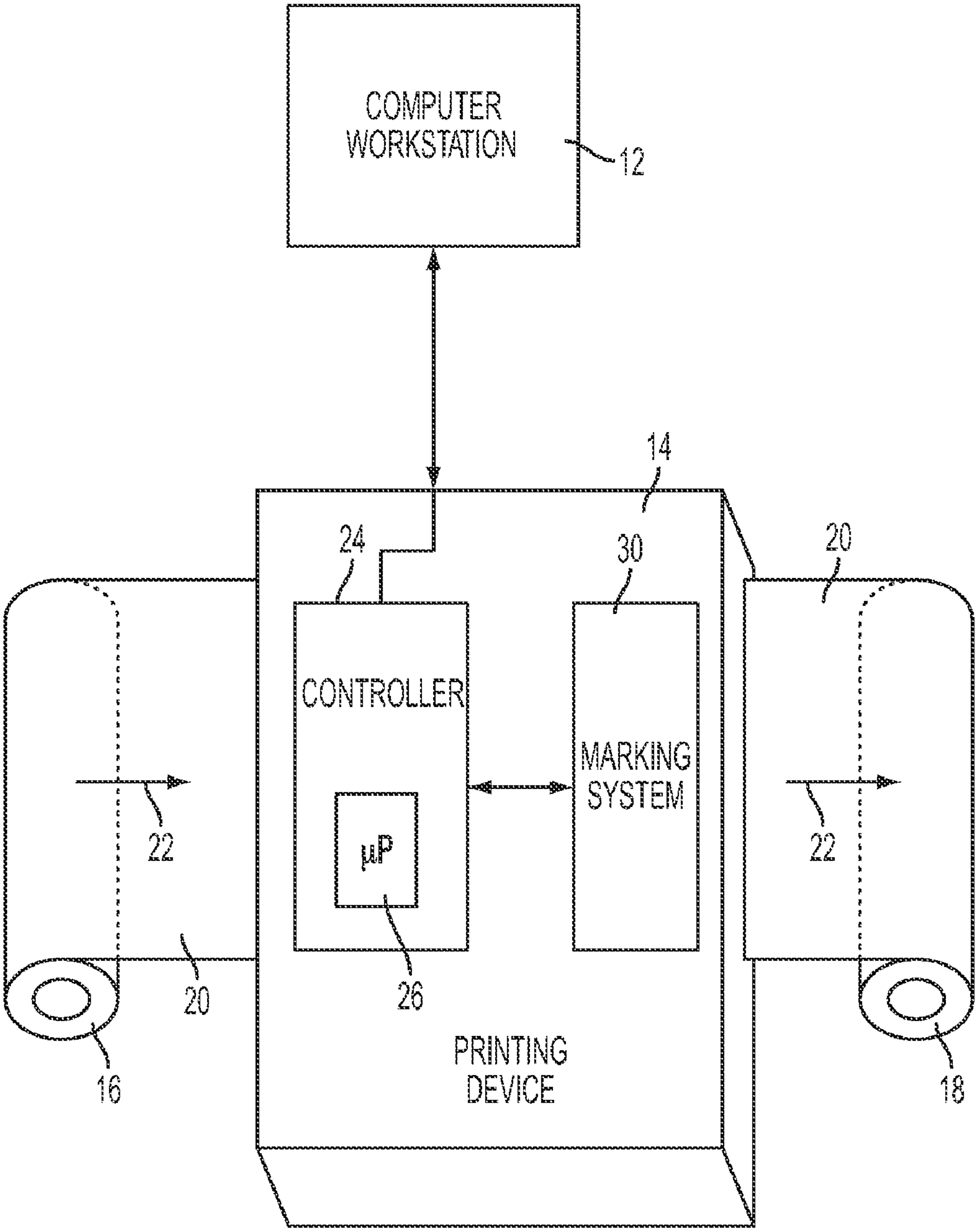
FIG. 1 shows a roll-to-roll printing application configured to compensate for pile height differential.

With reference to FIG. 1, a roll-to-roll printing system 10 is shown for a packaging application. The roll-to-roll printing system 10 includes a computer workstation 12, a printing device 14, an input roll of media 16, and an output roll of media 18. The input roll of media 16 contains a length of media substrate 20 that is fed to the printing device 14 in a feed direction 22. After the printing device prints images on the substrate 20, the substrate is fed to the output roll 18.

One or more images to be printed repeatedly using the roll-to-roll printing system 10 are created and/or stored at the computer workstation 12. The computer workstation 12 also contains information about the intended layout of the images when printed on the media substrate 20. Digital packaging data, including image data and layout data, is delivered to the printing device 14 from the workstation.

The printing device 14 is a digital printer that includes a controller 24 and a marking system 30. The controller 24 comprises a processor 26 configured to process the digital packaging data received from the computer workstation 12 and instruct the marking system 30 when and where to print on the substrate 20. The marking system 30 includes the components configured to deliver marking material to the substrate in order to form the desired image on the substrate 20. Accordingly, the marking system 30 may include, for example, a print head for delivering ink, a photosensitive imaging drum for delivering toner, or other device configured to deliver colorant to the substrate. The term "marking material" refers to material to be placed on a substrate, such as, for example, an ink, toner, or other material. The term "colorant" refers, for example, to pigments, dyes, mixtures thereof, such as mixtures of dyes, mixtures of pigments, mixtures of dyes and pigmants, and the like.

As discussed previously, at various points on the printed image, the colorant delivered to the substrate 20 will have a certain pile height which rises about the surface of the substrate 20. However, when the pile height significantly varies across an image, this significant pile height differential can result in distortions to the output roll 18. The controller 24 is configured to monitor pile height differentials in the printed images and mitigate the effects of such pile height differentials by adjusting the images printed to the substrate.

Image Imposition Adjustment

In at least one embodiment, the controller 24 is configured to mitigate the effects of the pile height differentials in the printed image by adjusting the position of the printed images on the substrate 20. In accordance with traditional imposition principles, the controller is adapted to minimize waste and impose as many images as possible on the substrate given the size of the substrate and the design and complexity of finishing operations, such as die cutting. However, the controller 24 is also configured to keep the output roll 18 relatively uniform by maintaining a relatively uniform pile height for the images printed on the substrate along and/or across the feed direction 22.

In order to maintain a relatively uniform pile height, the controller first calculates a printed height profile for the one or more images to be printed. This may be accomplished by estimating the image pile height at any location on the image. Image pixel height at any pixel location may be estimated by assuming that pixel height is generally constant with respect to pixel values (i.e., a value for each level of color separation). For example, given an image vector at each image pixel location and/or an image value for each color separation, and given a particular printing process or device, a proportionality constant for pile height may be empirically calculated. With this information, a pixel value to pile height transformation matrix may be determined. Alternatively, a simple look-up table may be created to determine the pile height at any particular pixel location. In either case, an estimation of the pile height at any pixel location can be provided for the images printed.

Figure 2:
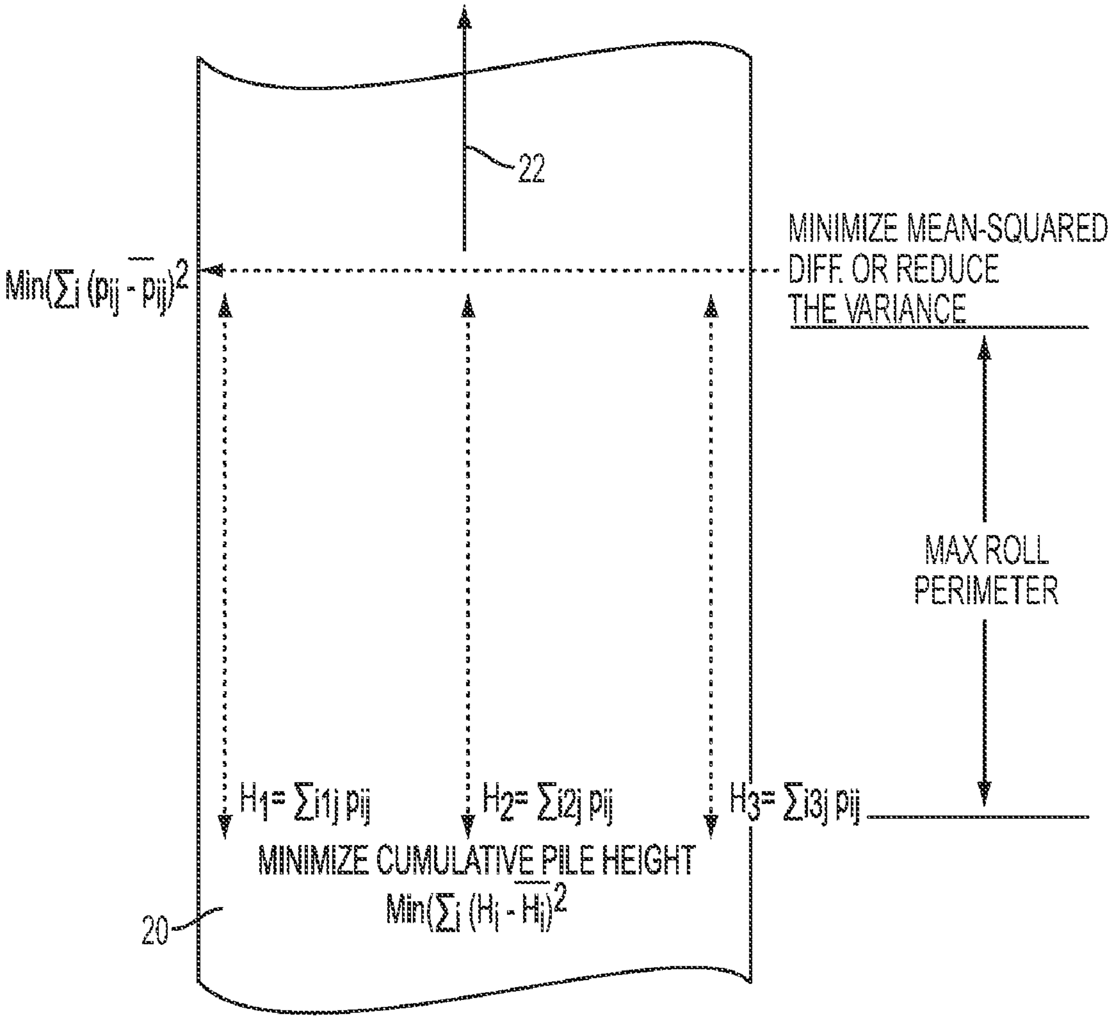
FIG. 2 is a diagram showing various calculations made by the printing device of FIG. 1 when minimizing pile height differentials.

With an estimate of the pile height at various pixel locations for an image, the controller 24 can determine a pile height differential for one or more images. The pile height differential is simply some measurement that provides some indication of the variance in pile height (or cumulative pile height) at two or more different locations. A pile height differential may be determined for the one or more images in a lateral direction perpendicular to the feed direction or in a direction parallel to the feed direction. For example, as shown in FIG. 2, a mean-squared pile height differential is calculated for each line of pixels in the direction perpendicular to the feed direction (i.e., for each row of printed pixels). Thus, the controller 24 calculates the following for each printed row:

$$\Sigma_i (p_{ij} - \bar{p}_{ij})^2$$

where $p_{ij}$ is each pile height for each pixel in a row, and where $\bar{p}_{ij}$ is the average pile height for the row.

This summation value provides a pile height differential that indicates whether the pile height variance in a given row (i.e., a row along the axis of the roll) is relatively large or small. A relatively smooth row will result in a smaller summation value indicating a small pile height variance across the row. A relatively bumpy row will result in a larger summation value indicating a large pile height variance across the row. Accordingly, the controller 24 is configured to monitor whether a particular row has (or will have) a large pile height differential that could lead to output roll distortions or a small pile height differential that is less likely to lead to output roll distortions.

In addition to monitoring the pile height differential in each row, the controller 24 may also monitor the cumulative pile height differential along two or more lines parallel to the feed direction (i.e., along a plurality of columns of printed pixels). While the pile height differential in the rows indicates how smooth the roll is along the axis, the cumulative pile height differential along columns perpendicular to the rows (i.e., parallel to the feed direction) indicates how cylindrical the roll is. When the roll is not cylindrical and becomes too elliptical or otherwise distorted, the roll-to-roll operation suffers. Accordingly, in at least one embodiment, two or more columns of cumulative pile height are determined. In the exemplary embodiment of FIG. 2, three columns of cumulative pile height are calculated. As shown in FIG. 2, the controller calculates the following:

$$H_1 = \Sigma_{i1j} p_{ij}$$

$$H_2 = \Sigma_{i2j} p_{ij}$$

$$H_3 = \Sigma_{i3j} p_{ij}$$

where $H_i$ represents the cumulative pile height for a given column.

After calculating the cumulative pile heights, the controller then compares the cumulative pile heights to determine a cumulative pile height differential for the columns. In particular, the controller calculates a cumulative pile height differential according to the following equation:

$$\Sigma_i (H_i - \bar{H}_i)^2$$

where $\bar{H}_i$ represents the average cumulative pile height for all columns.

It will be recognized that, depending on the width of the roll, two or more points are selected for minimizing the cumulative pile height. Two points (one on each edge) are selected for narrow webs and three or more points are selected if the film is thin and if the web width is large.

By calculating the pile height differential in rows and columns, the controller is able to identify portions of the printed images that include relatively large pile height differentials from other portions of the printed images. The controller then performs a minimization function on the calculated mean square differential values. This minimization function provides an indication of how subsequent printed images should be repositioned to minimize the cumulative pile height differentials and thus minimize distortions in the output roll 18. Repositioning of subsequent images may be made through translation of the images (i.e., shifting the subsequently printed images laterally) or rotation of the images (i.e., rotating the subsequently printed images, such as 90° or 180° rotations).

Figure 3:
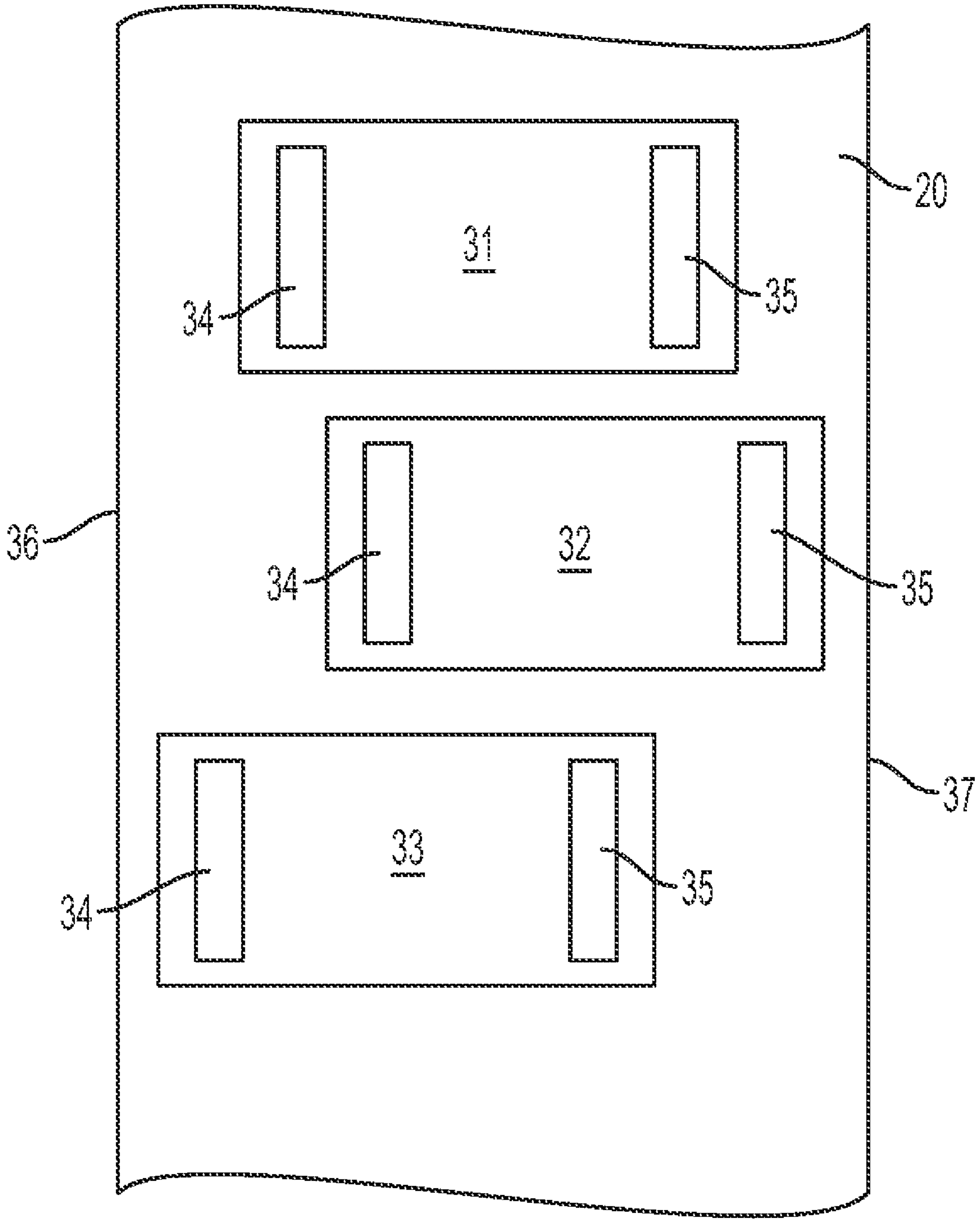
FIG. 3 shows a substrate having various images translated upon the substrate in order to minimize pile height differentials.

With reference now to FIG. 3, one example of repositioning images by translation is shown. In FIG. 3, a first image 31 is printed in a central portion of the substrate 20. The first image includes two areas 34 and 35 of significantly increased pile height. Area 34 may be, for example, an area where a first prominent packaging feature is printed and area 35 may be an area where a second prominent packaging feature is printed. The controller has calculated pile height differentials for the images and has determined that a compensation for the calculated pile height differentials may be achieved by translating subsequently printed images. Thus, the second printed image 32 is shifted laterally toward the right edge 37 of the substrate. Also, the third printed image 33 is shifted laterally toward the left edge 36 of the substrate. With the second and third images 32 and 33 translated on the substrate relative to the first image, the cumulative pile height differential for the roll is minimized over time. Minimization of the cumulative pile height differential enables the output roll to put uniform tension across the substrate, resulting in a more taut output roll 18 which is relatively circular and uniform and unlikely to cause issues downstream in the packaging process.

Figure 4:
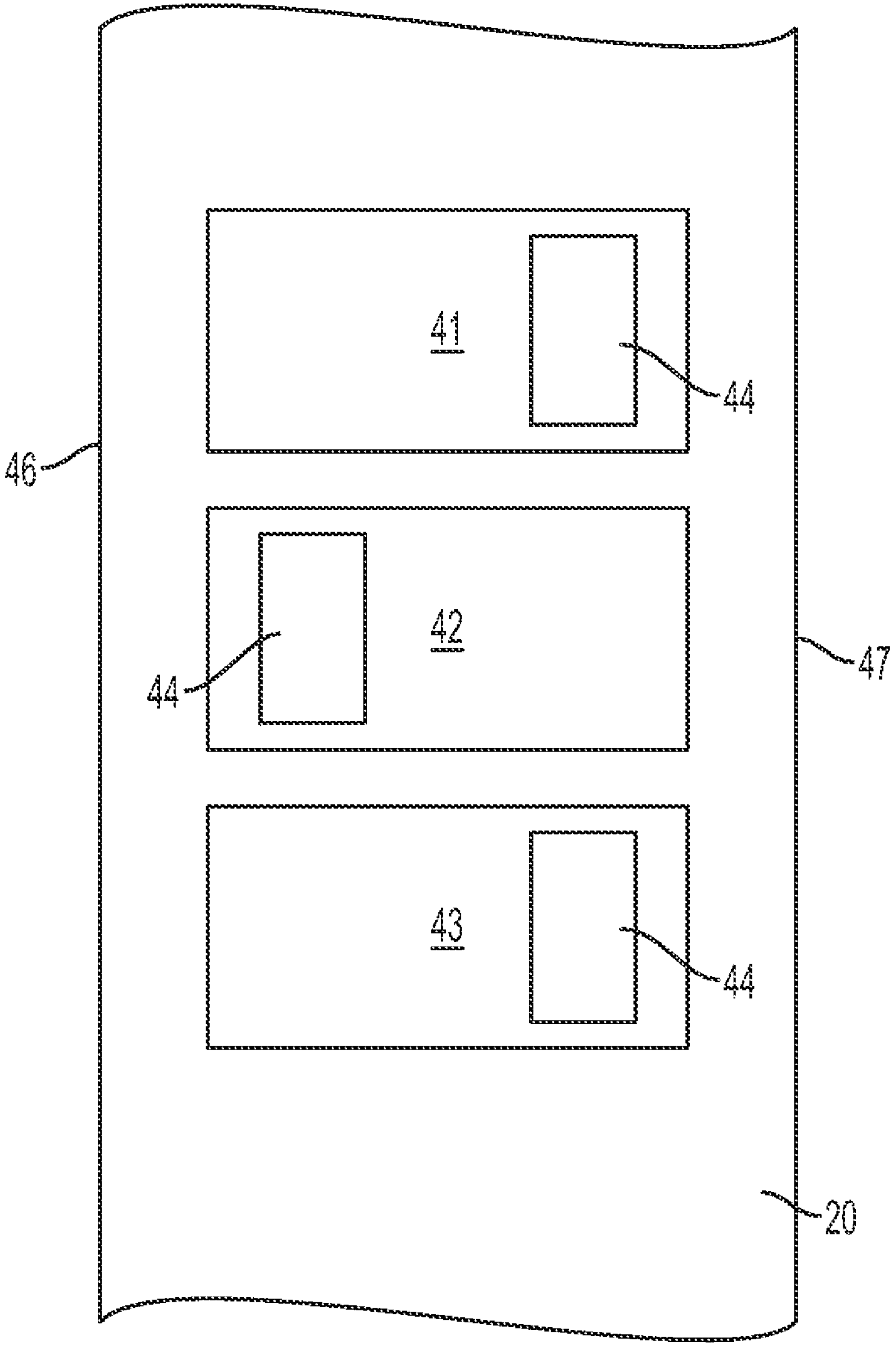
FIG. 4 shows a substrate having various images rotated upon the substrate in order to minimize pile height differentials.

With reference to FIG. 4, one example of repositioning images by rotation is shown. In FIG. 4, a first image 41 is printed in a central portion of the substrate 20. The first image includes areas 44 of significantly increased pile height. Area 44 may be an area where a packaging header is printed. The controller has calculated pile height differentials for the images and has determined that a compensation for the calculated pile height differentials may be achieved by rotating subsequently printed images. Thus, the second printed image 42 is rotated 180° on the substrate relative to the first printed image 41. Also, the third printed image 43 is rotated 180° on the substrate relative to the second printed image 42. With the first, second and third images 41, 42 and 43 positioned on the substrate with such alternating rotations, the mean-square pile height differential is minimized in the direction perpendicular to the feed direction and thus the cumulative pile height differential for the roll is minimized over time. This results in a more taut output roll 18 which is relatively uniform and unlikely to cause issues downstream in the packaging process.

Smart Image Adjustment

Figure 5:
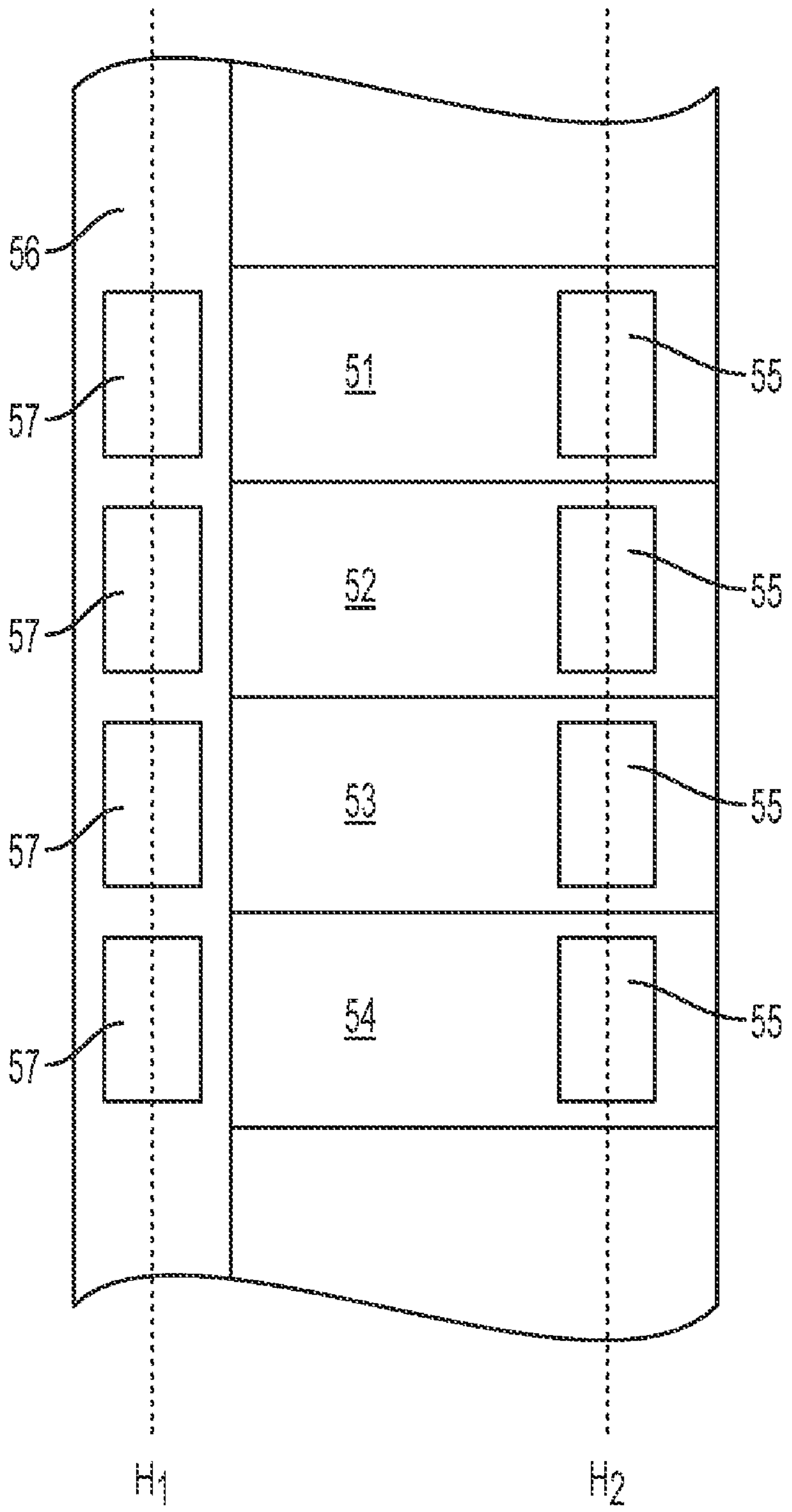
FIG. 5 shows a substrate having patches provided on the substrate in order to minimize pile height differentials.

With reference now to FIGS. 1, 2 and 5, in one embodiment the controller 24 is configured to mitigate the effects of the pile height differentials in the printed image by modifying the images printed on the media using the printing device. According to this method, patches 57 are printed on the substrate 20 in selected pile height management areas. The patches are provided as either additional images of a known height profile in pile height management areas or additional marking material (e.g., toner or ink) provided to increase the pile height profile on the actual desired images to be printed on the media.

When the patches are provided as additional marking material on the desired images, excess marking material is added to the images to increase the pile height of the image at particular locations on the image. This additional marking material may be provided as an extra amount of marking material in addition to what is required to produce a certain color at a given location on the image. For example, a print head may be instructed to deliver twice the normal amount of black ink at a given pixel location on an image in order to increase the pile height at that location to a desired height. Alternatively, the complete image, or portions of the image, may be overprinted to effectively increase the pile height across the image. Accordingly, an image that is overprinted one time may effectively double the pile height across the image.

When the patches are provided as additional images in pile height management areas, the patches 57 may take any of several forms such as lines, rectangles, dots, or any other shape or design. The patches may be provided continuously or periodically along the length of the substrate 20 in the feed direction 22. The more uniform and continuous the patch along the feed direction 22, the more circular the output roll will be at that position.

The pile height management areas may be waste areas (e.g., pre-determined areas/lines to be cut away) on the substrate or may be blank spaces intentionally left on the images for pile-height management. Depending on the profile of the image to be imposed, it can be determined whether naturally occurring waste areas can be used for pile height management or whether specially designed blank areas will need to be added within the boundaries of the image to be printed. One way to test whether blank areas will need to be added to an image is to use the pile height differential calculations discussed above and see the pile height differential values are above an empirically determined threshold. With the pile height management area known, the printing device dynamically adds image patches to the substrate at print time in order to compensate for any calculated pile height differential. In this case, the cumulative image differential is minimized by changing the $H_i$ values by adding the patches at selected pile height management areas.

With reference now to FIG. 5, a length of substrate 20 is shown with a pile height management area provided in a waste area 56 along the lateral edge of the substrate. Each of the printed images 51-54 include an area of increased pile height 55 on the substrate. A plurality of patches 57 in the form of rectangles are periodically provided in the waste area 56. The plurality of patches 57 have a pile height such that the cumulative pile height $H_1$ is substantially the same as the cumulative pile height at $H_2$. Without the patches 57, the cumulative pile height (H2) on the right side of the substrate 20 would quickly increase significantly past the cumulative pile height (H1) on the left side of the substrate 20. This would result in a substantial cumulative pile height differential between the left side and the right side of the destination role 18, resulting in distortion of the destination role 18. However with the patches 57 provided on the left side of the substrate in FIG. 5, the cumulative pile height differential is minimized, resulting in a more uniform destination role 18.

With smart image adjustment, the input to the controller is a desired image (which may be provided to the controller with some positional constraints) and the output from the controller is a modified image that is rendered on the substrate. As the image information is reviewed at the controller, the cross sectional height differential and cumulative pile height differential is dynamically calculated and a new image is computed for adding to the patch in order to mitigate the effects of the pile height differentials at the output roll 18. Accordingly, in the embodiment of smart image adjustment, an original image is printed and subsequent images are modified by adding patches to the original image. The patches may be provided within the confines of the desired image in blank areas, or as set forth in FIG. 5, may be printed outside the confines of the desired image in waste areas of the substrate.

Closed Loop Monitoring of Cumulative Pile Height

Figure 6:
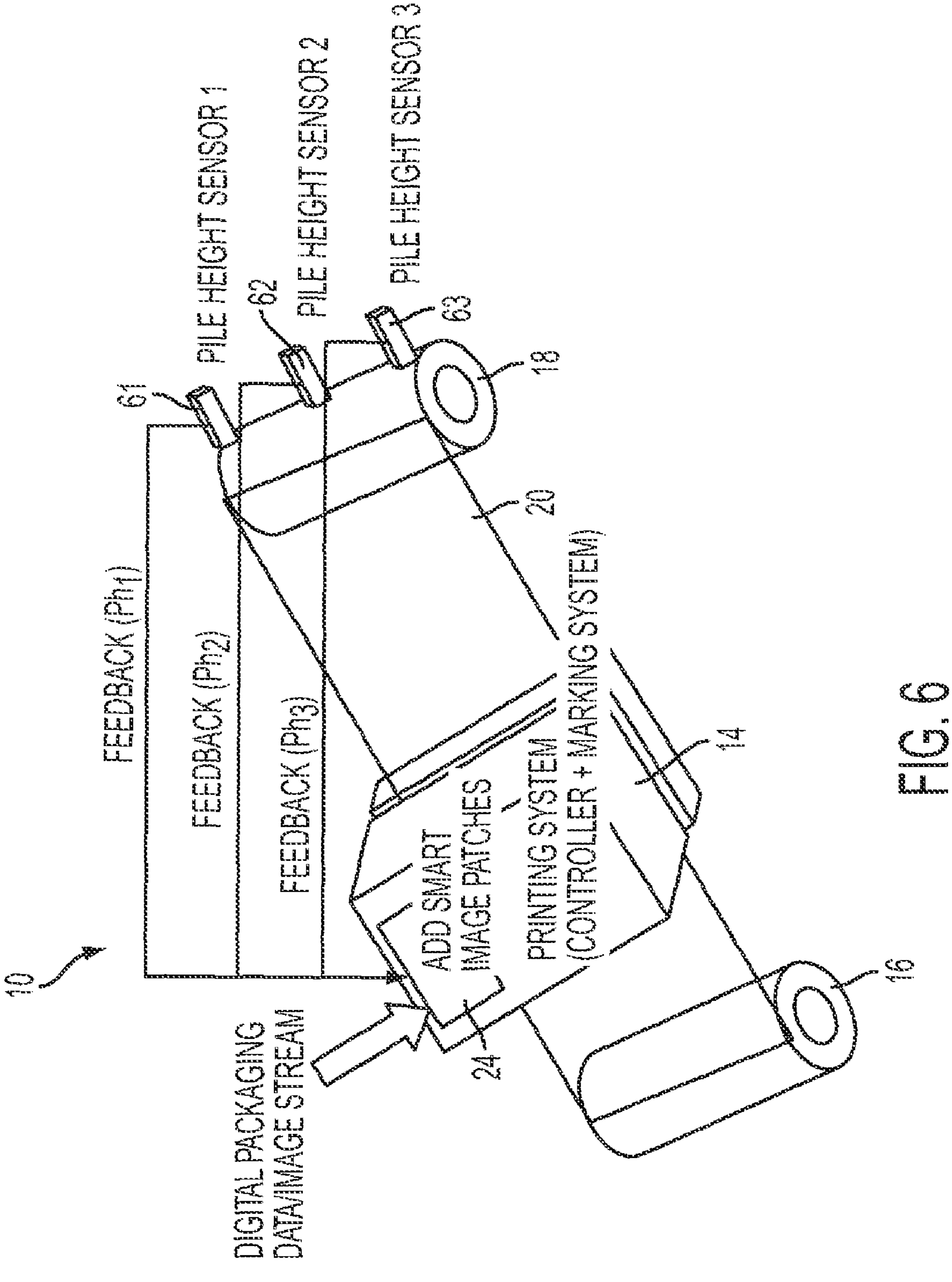
FIG. 6 shows an alternative embodiment of the roll-to-roll printing application of FIG. 1 including a plurality of pile height sensors and closed loop control.

With reference now to FIGS. 1 and 6, in one embodiment the effects of pile height differentials in the printed image are mitigated by measuring the pile height at the output roll in real-time and feeding the measured pile height information back to the controller 24. Based on the measured pile height information provided to the controller 24, image patches may be added to the printed images to minimize cumulative pile height differentials measured at the output roll.

In the embodiment of FIG. 6, pile height sensors 60 are placed on the output roll 18 to monitor the cumulative pile height at a plurality of locations of the output roll. For example, in FIG. 6, three pile height sensors 61-63 are shown, with one sensor 61 on a left side of the output role 18, one sensor 62 in the middle of the output role 18, and one sensor 63 on the right side of the output role 18. The sensors 61-63 may be, for example, mechanical sensors that physically touch the role 18 at the sensor location to determine a pile height. As another example, the sensors 61-63 may be optical sensors, such as a laser capable of measuring the pile height at the sensor location.

Each of the sensors 61-63 measures the cumulative pile height on the roll 18 at the sensor location and outputs a measurement value. The sensor measurement values are fed back to the controller 24 as negative feedback designed to change the image pile height. The controller 24 takes the sensor measurements and calculates a patch to be added to the printed images to compensate for the cumulative pile height differential at the output roll 18. As explained above, the patch is provided in a pile height management area on the substrate. Accordingly, by virtue of sensors that feedback pile height measurements to the controller 24, the embodiment of FIG. 6 provides for closed loop control of the cumulative pile height differential at the output roll 18.

In FIG. 6, the values returned by the sensors include $Ph_1$ for sensor 61, $Ph_2$ for sensor 62, and $Ph_3$ for sensor 63. The controller 24 sets the image patch pile height at corresponding locations to (1-normalized($Ph_1$)), (1-normalized($Ph_2$)) and (1-normalized($Ph_3$)). The normalization of sensor value can be made dynamic by using the maximum value of the three values to normalize, i.e.

$$\text{normalized}(Phi)=Phi/\max(Ph1,Ph2,Ph3).$$

This dynamic normalization helps to minimize the cost for the added image patches. In particular, the sensors allow for a certain threshold of error to be crossed before incurring the cost of correction (i.e. ink and imaging cost). Furthermore, because this is a cumulative measure, (i.e. sensors are effectively measuring the pile height across entire length of the substrate printed so far and not just a finite window) minor height differentials happening in shorter sections of the film often may cancel out on a cumulative basis, thus removing the need for correction at that time.

As discussed previously, image patches are added to waste or designated areas on a continuous or periodic basis. However, the pile height added is made inverse to the output pile height.

Yet another option for normalization is to use a constant high value for the image patches. Accordingly, with the constant high value option a known pile height is continuously provided in one or more print management areas. The cumulative effect of the known pile height is a high cumulative pile height value in the image management area. If two or more constant high value patches are added across and on opposite sides of the substrate, a relatively uniform output roll is easily achieved. The advantage of the constant high value normalization is to quickly achieve balance of pile height.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. For example, with the closed loop control system of FIG. 6, the controller may be configured to reposition subsequently printed images to reduce cumulative pile height differentials (e.g., by translation or rotation) rather than by adding patches to the images as described above. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of printing images on media provided from an input roll of media, the method comprising the steps of:
- (a) feeding the media from the input roll of media to a printing device in a feed direction;
- (b) printing at least one image on the media using the printing device;
- (c) receiving the printed media at an output roll;
- (d) determining a pile height differential for the at least one image; and
- (e) modifying subsequent images printed on the media in response to the determined pile height differential.

2. The method of claim 1, the step of determining the pile height differential further comprising:
- estimating a printed pile height profile for at least one of the images.

3. The method of claim 2, the step of determining the pile height differential further comprising:
- calculating a plurality of cumulative pile heights for the at least one of the images along a plurality of lines parallel to the feed direction.

4. The method of claim 2, the step of determining the pile height differential further comprising:
- calculating a cross-sectional pile height differential in a direction perpendicular to the feed direction.

5. The method of claim 1, the step of modifying the subsequent images printed on the media further comprising:
- adjusting the position the subsequent images printed on the media relative to the position the at least one image was printed on the media.

6. The method of claim 5, the step of adjusting the position of the subsequent images further comprising:
- translating the subsequent images on the printed media from the position of the at least one image that was printed on the media.

7. The method of claim 6, the step of adjusting the position of the subsequent images further comprising:
- rotating the subsequent images on the printed media from the position of the at least one image that was printed on the media.

8. The method of claim 1, the step of determining the pile height differential further comprising:
- monitoring the destination role using pile height sensors.

9. The method of claim 8, the pile height sensors are configured to deliver a signal to the printing device, and the step of modifying the subsequent images further comprising:

adding at least one patch of a known pile height to the media using the printing device in order to compensate for the pile height differential.

10. The method of claim 1, the step of modifying the subsequent images printed on the media further comprising:

adding at least one patch of a known pile height to the subsequent images.

11. The method of claim 10 wherein the at least one patch is provided in a waste area of the media.

12. The method of claim 10 wherein the at least one patch is provided as periodic shapes on the media.

13. The method of claim 1 wherein the step of determining the pile height differential is based on an estimate of the pile height at a plurality of locations on the at least one image.

14. A method of printing images on media having two lateral edges, the method comprising the steps of:

(a) printing at least one initial image on the media in a first position between the two lateral edges;

(b) determining a pile height differential from the at least one initial image;

(c) determining a second position between the two lateral edges of the media for at least one subsequent image, wherein determination of the second position is based at least in part on the determined pile height differential on the printed media; and (d) printing the at least one subsequent image on the media in the second position.

15. The method of claim 14 wherein the second position is a translated position from the first position, the translated position being lateral to a feed direction of the media.

16. The method of claim 14 wherein the second position is a rotated position from the first position.

* * * * *